(12) United States Patent
Manahan et al.

(10) Patent No.: US 9,869,460 B2
(45) Date of Patent: Jan. 16, 2018

(54) LIGHTING APPLICATIONS USING ORGANIC LIGHT EMITTING DIODES

(71) Applicants: Joseph Michael Manahan, Manlius, NY (US); Richard Rothenberger, Syracuse, NY (US); Grant L. Gawronski, The Woodlands, TX (US)

(72) Inventors: Joseph Michael Manahan, Manlius, NY (US); Richard Rothenberger, Syracuse, NY (US); Grant L. Gawronski, The Woodlands, TX (US)

(73) Assignee: Cooper Technologies Company, Houston, TX (US)

( * ) Notice: Subject to any disclaimer, the term of this patent is extended or adjusted under 35 U.S.C. 154(b) by 256 days.

(21) Appl. No.: 14/688,596

(22) Filed: Apr. 16, 2015

(65) Prior Publication Data

US 2015/0226414 A1    Aug. 13, 2015

Related U.S. Application Data

(62) Division of application No. 13/786,223, filed on Mar. 5, 2013, now Pat. No. 9,033,547.

(Continued)

(51) Int. Cl.
*F21V 21/00* (2006.01)
*F21V 23/04* (2006.01)
(Continued)

(52) U.S. Cl.
CPC .............. *F21V 23/04* (2013.01); *F21K 9/60* (2016.08); *F21V 5/04* (2013.01); *F21V 21/14* (2013.01);
(Continued)

(58) Field of Classification Search
CPC ..... F21K 9/60; F21S 2/00; F21S 8/033; F21S 8/04; F21V 15/01; F21V 5/04;
(Continued)

(56) References Cited

U.S. PATENT DOCUMENTS 5,580,163 A   12/1996  Johnson, II
6,120,164 A    9/2000  Libin et al.
(Continued)

FOREIGN PATENT DOCUMENTS

EP   1319889   6/2003
RU   2212727   9/2003
(Continued)

OTHER PUBLICATIONS

Chinese Office Action issued in Chinese patent application No. 201480012384.7, dated Nov. 14, 2016, 6 pages, Chinese Patent Office.

(Continued)

*Primary Examiner* — Ali Alavi
(74) *Attorney, Agent, or Firm* — King & Spalding LLP

(57) ABSTRACT

A lighting device that includes a first panel of light sources, where the first panel has a first edge. The lighting device can also include a second panel of light sources, where the second panel has a second edge, where the second edge of the second panel of light sources is mechanically coupled to the first edge of the first panel of light sources. The first panel of light sources and the second panel of light sources can form an angle relative to each other. Adjusting the angle can adjust the light output from the light sources. Such an angle can be formed based on a target level of light received by a target area.

20 Claims, 7 Drawing Sheets

Related U.S. Application Data

(60) Provisional application No. 61/691,098, filed on Aug. 20, 2012.

(51) Int. Cl.

| | | |
|---|---|---|
| *F21V 21/14* | (2006.01) | |
| *F21V 5/04* | (2006.01) | |
| *F21V 21/30* | (2006.01) | |
| *H05B 33/08* | (2006.01) | |
| *F21V 23/06* | (2006.01) | |
| *F21K 9/60* | (2016.01) | |
| *F21V 21/15* | (2006.01) | |
| *F21S 2/00* | (2016.01) | |
| *F21S 8/00* | (2006.01) | |
| *F21S 8/04* | (2006.01) | |
| *F21V 15/01* | (2006.01) | |
| *H05B 37/02* | (2006.01) | |
| *F21Y 105/00* | (2016.01) | |
| *F21Y 105/10* | (2016.01) | |
| *F21Y 115/10* | (2016.01) | |
| *F21Y 115/15* | (2016.01) | |
| *F21Y 113/13* | (2016.01) | |
| *F21Y 113/20* | (2016.01) | |

(52) U.S. Cl.
CPC ............ *F21V 21/30* (2013.01); *F21V 23/06* (2013.01); *H05B 33/0845* (2013.01); *H05B 33/0896* (2013.01); *F21S 2/00* (2013.01); *F21S 8/033* (2013.01); *F21S 8/04* (2013.01); *F21V 15/01* (2013.01); *F21V 21/15* (2013.01); *F21V 23/0442* (2013.01); *F21Y 2105/00* (2013.01); *F21Y 2105/10* (2016.08); *F21Y 2113/13* (2016.08); *F21Y 2113/20* (2016.08); *F21Y 2115/10* (2016.08); *F21Y 2115/15* (2016.08); *H05B 37/0245* (2013.01)

(58) Field of Classification Search
CPC ............ F21Y 2101/00; F21Y 2113/13; F21Y 2113/20; F21Y 2115/10; F21Y 2115/15
See application file for complete search history.

(56) References Cited

U.S. PATENT DOCUMENTS

| | | |
|---|---|---|
| 6,585,395 B2 | 7/2003 | Luk |
| 6,626,558 B2 | 9/2003 | Momot et al. |
| 8,025,428 B2 | 9/2011 | Duguay et al. |
| 8,841,834 B2 * | 9/2014 | Pickard .................... F21S 8/02 313/501 |
| 2001/0053082 A1 | 12/2001 | Chipalkatti et al. |
| 2003/0160684 A1 | 8/2003 | Cem |
| 2005/0231945 A1 * | 10/2005 | Leibinger .......... H05B 33/0863 362/231 |
| 2007/0147084 A1 | 6/2007 | Lin |
| 2008/0025026 A1 | 1/2008 | Lee et al. |
| 2009/0140665 A1 * | 6/2009 | Park ..................... G09G 3/3426 315/291 |
| 2009/0303705 A1 * | 12/2009 | Waumans ................. F21S 8/04 362/228 |
| 2011/0013420 A1 | 1/2011 | Coleman et al. |
| 2011/0080052 A1 | 4/2011 | Sato |
| 2011/0095618 A1 | 4/2011 | Schatz et al. |
| 2011/0317428 A1 | 12/2011 | Paik et al. |
| 2012/0127713 A1 | 5/2012 | Lee |
| 2012/0250296 A1 | 10/2012 | Lu et al. |
| 2014/0185175 A1 * | 7/2014 | Murphy ................. H01H 37/52 361/104 |

FOREIGN PATENT DOCUMENTS

| | | | |
|---|---|---|---|
| RU | 65286 | 7/2007 | |
| RU | 2408476 | 1/2011 | |
| TW | 200803956 | 1/2008 | |
| WO | WO 2011136437 A1 * | 11/2011 | ......... H01L 27/3225 |

OTHER PUBLICATIONS

Translation of Chinese Office Action issued in Chinese patent application No. 201480012384.7, 3 pages.
Translation of TW200803956 via Lexsis Nexsis Total Patents, 9 pages.
Chinese Office Action issued in Chinese patent application No. 201380054777.X , dated Jun. 2, 2017, 33 pages including translation, Chinese Patent Office.
E. Chukhlantseva, PCT/US2014/019472 International Search Report and Written Opinion, dated May 11, 2014, 12 pages, Russian International Searching Authority, Moscow, Russia.
Hye Lyun Park, PCT/US2013/029189 International Search Report and Written Opinion, dated Jun. 25, 2013, 14 pages, Korean International Searching Authority, Korea.
Author unknown, Webpage Mimosa—lighting project—Phillips describing Mimosa—Moving Flowers lighting project, Milan, Spring 2010, one page, retrieved form the Internet Mar. 25, 2014 at www.lighting.philips.com/main/projects/mimosa.wpd.

\* cited by examiner

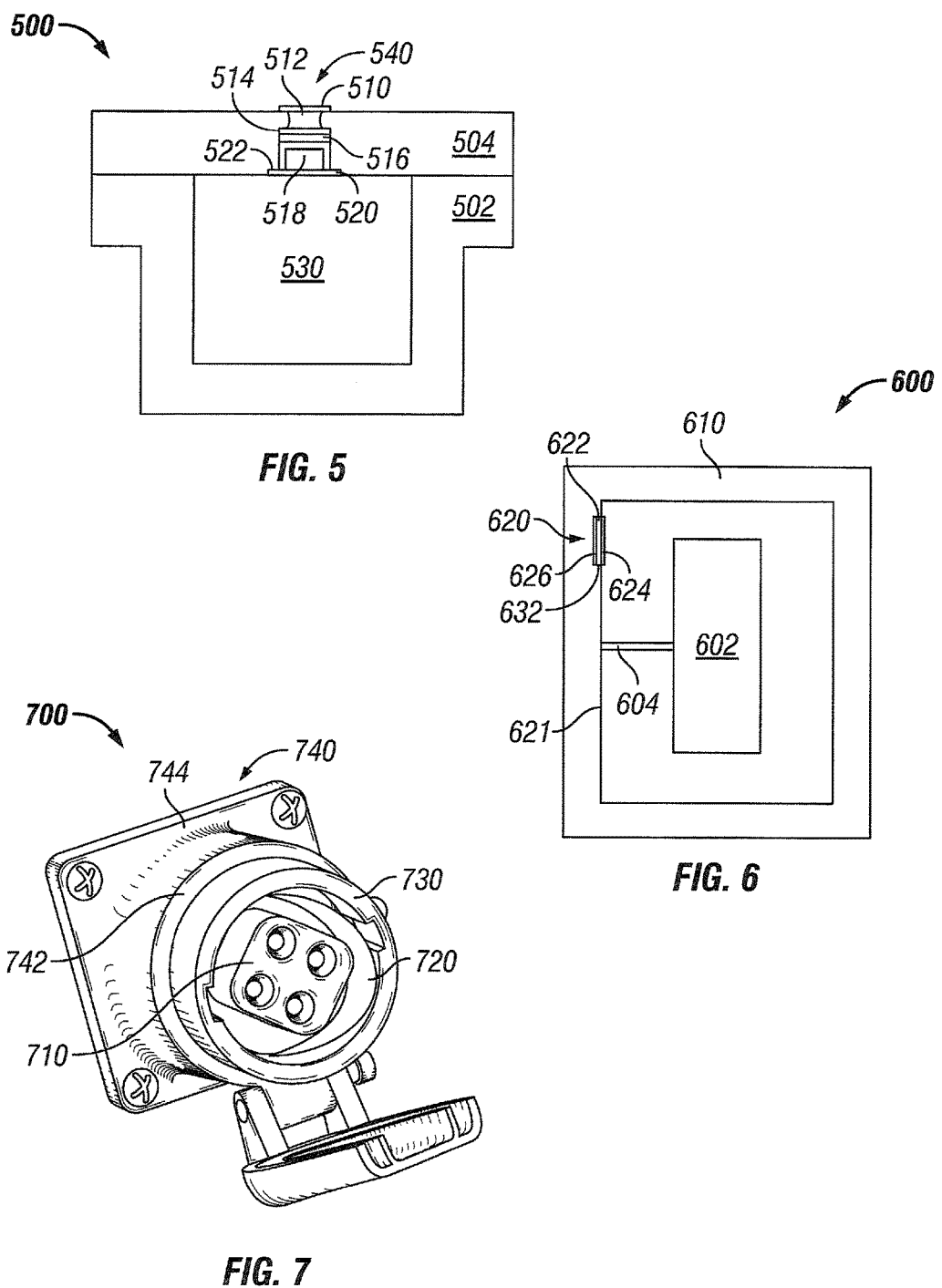

LIGHTING APPLICATIONS USING ORGANIC LIGHT EMITTING DIODES

CROSS-REFERENCE TO RELATED APPLICATIONS

This application is a divisional application of and claims priority under 35 U.S.C. §121 to U.S. patent application Ser. No. 13/786,223, entitled "Lighting Applications Using Organic Light Emitting Diodes" and filed on Mar. 5, 2013, which claims priority under 35 U.S.C. §119 to U.S. Provisional Patent Application Ser. No. 61/691,098, titled "Lighting Applications Using Organic Light Emitting Diodes" and filed on Aug. 20, 2012. The entire contents of the above-listed applications are hereby incorporated herein by reference.

The present application is further related to U.S. patent application Ser. No. 13/786,246, titled "Inductive Power Transmission for Electrical Devices," filed on Mar. 5, 2013.

TECHNICAL FIELD

Embodiments described herein relate generally to organic light emitting diodes (OLEDs), and more particularly to systems, methods, and devices for applications using OLEDs.

BACKGROUND

OLEDs are beginning to emerge as an alternative to other types of light sources, including LEDs. Compared to each of the other light sources, OLEDs have some distinct advantages and disadvantages. As a result of the current disadvantages, OLEDs have not gained wide commercial acceptance at this time.

SUMMARY

In general, in one aspect, the disclosure relates to a lighting device. The lighting device can include a first panel of light sources, where the first panel has a first edge. The lighting device can also include a second panel of light sources, where the second panel has a second edge, where the second edge of the second panel of light sources is mechanically coupled to the first edge of the first panel of light sources. The first panel of light sources and the second panel of light sources can form an angle relative to each other. The angle can be adjustable and set based on providing a target level of light received by a target area.

In another aspect, the disclosure can generally relate to a lighting device. The lighting device can include a number of light-emitting diodes (LEDs) disposed on a mounting surface. The lighting device can also include a number of organic LEDs (OLEDs) disposed on the mounting surface.

In yet another aspect, the disclosure can generally relate to an electrical enclosure. The electrical enclosure can include a number of surfaces forming a cavity. The electrical enclosure can also include at least one device mechanically coupled to one surface of the surfaces. The electrical enclosure can further include an organic light-emitting diode (OLED) disposed on another surface of the surfaces. The OLED can provide illumination directed toward the at least one device.

In still another aspect, the disclosure can generally relate to a lighting fixture. The lighting fixture can include at least one organic light-emitting diode (OLED) disposed on a light source platform. The lighting fixture can also include a housing mechanically coupled to the light source platform. The lighting fixture can further include a power source disposed within the housing and electrically coupled to the at least one OLED. The housing, the power source, and the at least one OLED are exposed to a high-temperature environment.

In yet another aspect, the disclosure can generally relate to an encapsulated light fixture. The encapsulated light fixture can include a housing having a cavity within at least one wall. The encapsulated light fixture can also include a lens mechanically coupled to the housing, where the lens diffuses light emitted from within the cavity of the housing, and where a hermetic seal formed between the lens and the housing encapsulates the cavity to generate an encapsulated cavity. The encapsulated light fixture can further include a power supply disposed within the encapsulated cavity. The encapsulated light fixture can also include at least one organic light-emitting diode (OLED) disposed within the encapsulated cavity and electrically coupled to the power source.

These and other aspects, objects, features, and embodiments will be apparent from the following description and the appended claims.

BRIEF DESCRIPTION OF THE DRAWINGS

The drawings illustrate only example embodiments of lighting applications using OLEDs and are therefore not to be considered limiting of its scope, as lighting applications using OLEDs may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIG. 5 shows an example electrical enclosure using OLEDs in accordance with certain example embodiments.

FIG. 6 shows another example electrical enclosure using OLEDs in accordance with certain example embodiments.

FIG. 7 shows yet another example electrical enclosure using OLEDs in accordance with certain example embodiments.

DETAILED DESCRIPTION OF EXAMPLE EMBODIMENTS

Figure 1:
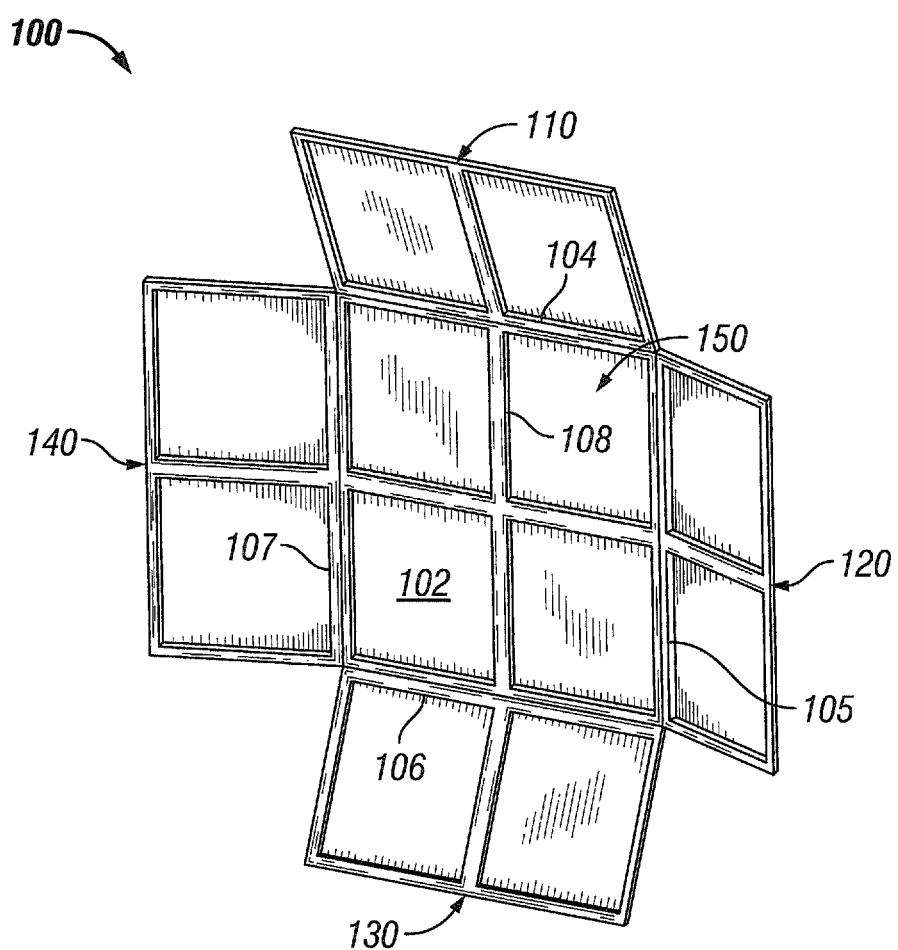
FIG. 1 shows an example lighting device using OLEDs in accordance with certain example embodiments.

The example embodiments discussed herein are directed to systems, apparatuses, and methods of lighting applications using OLEDs. OLEDs generate a relatively small amount of heat when operating (compared to other types of light sources, including but not limited to LED, incandescent, halogen, compact fluorescent, and metal halide). In some cases, OLEDs are flexible, which means that OLEDs can be wrapped around objects, bent, and/or otherwise manipulated into a particular configuration. Further, OLEDs are a more diffused light source. In other words, the light emitted by an OLED is spread substantially evenly across the surface of the OLED.

OLEDs also tend to operate more efficiently when operating at higher temperatures, which makes OLEDs more suited for certain operating environments that are exposed to higher temperatures. Such environments can include, but are not limited to, hazardous areas, explosion-proof enclosures and other types of electrical enclosures that house one or more heat generating devices (e.g., variable frequency drives, programmable logic controllers), and encapsulated enclosures. OLEDs can also consume less energy to generate light when compared to other light sources.

The OLEDs described herein can be any type of OLED system including, but not limited to, discrete OLEDs, OLED arrays, chip-on-board OLEDs, edge lit OLED panels, and surface mounted OLEDs. The OLEDs can emit light in one or more of a number of different colors. In alternative example embodiments, a combination of OLEDs can be used to emit light in one or more colors. For example, a portion of the OLEDs emit light in one color, such as white, and another portion of the OLEDs emit light in a second color different from the first, such as red, blue, green, or amber. The OLEDs can also be of any shape, size, and brightness.

The OLEDs described herein can be powered by one or more of a number of sources. For example, the OLEDs can be powered by a power source that is located externally from an example lighting enclosure and that is electrically coupled to the OLEDs by one or more conductors. As another example, example OLEDs can be powered by a battery (e.g., fixed, rechargeable) disposed within an example enclosure that includes the OLEDs. As yet another example, example OLEDs can be powered by inductive power transmission, as described in U.S. patent application Ser. No. 13/786,246, titled "Inductive Power Transmission for Electrical Devices," filed on Mar. 5, 2013, the entire contents of which are hereby incorporated by reference.

While example embodiments described herein are directed to OLEDs, such embodiments can be used with one or more of a number of other types of light sources, including but not limited to LED, incandescent, halogen, compact fluorescent, and metal halide. For example, the embodiments described below with respect to FIGS. 2A and 2B can be used with OLEDs, LEDs, incandescent light sources, other light sources, or any combination thereof. Thus, example embodiments described herein should not be considered limited to OLEDs.

The example embodiments described herein can be positioned in one or more of a number of locations (e.g., indoors, outdoors) and/or be exposed to one or more of a number of environments. Examples of such environments can include, but are not limited to, a hazardous environment, a corrosive environment, an environment with high moisture/humidity, a dry environment, an environment with high temperatures, an environment with low temperatures, a caustic environment, a windy environment, and a dust environment. For example, the example electrical enclosures and lighting fixtures described below in FIGS. 5-8B can be used in hazardous and/or corrosive environments.

Example embodiments for various devices using OLEDs will be described more fully hereinafter with reference to the accompanying drawings, in which example embodiments of OLEDs are shown. OLEDs may, however, be embodied in many different forms and should not be construed as limited to the example embodiments set forth herein. Rather, these example embodiments are provided so that this disclosure will be thorough and complete, and will fully convey the scope of OLEDs to those or ordinary skill in the art. Like, but not necessarily the same, elements (also sometimes called components) in the various figures are denoted by like reference numerals for consistency.

FIG. 1 shows an example lighting device 100 using OLEDs in accordance with certain example embodiments. In one or more embodiments, one or more of the components shown in FIG. 1 may be omitted, repeated, and/or substituted. Accordingly, embodiments of a lighting device should not be considered limited to the specific arrangements of components shown in FIG. 1.

Referring to FIG. 1, the lighting device 100 includes a number of panels of OLEDs 102 that are mechanically coupled to each other. Each of the panels described below are examples and can have any number of OLEDs 102 in any configuration (e.g., 1×1, 3×3, 4×1) and having any shape (e.g., rectangular, hexagonal, triangular) and/or orientation. The shape of a panel can be the same or different than the shape of the OLEDs 102 within the panel. Further, the shape and/or size of the OLEDs 102 within a panel and/or between panels can be the same or different.

As shown in FIG. 1, there is a central panel 150 of OLEDs 102 in a rectangular shape. The central panel 150 of OLEDs 102 has four similarly rectangular OLEDS 102 in a 2×2 configuration. The outer perimeter of the central panel 150 includes a top edge 104, a right side edge 105, a bottom edge 106, and a left side edge 107. Each of these four edges (i.e., the top edge 104, the right side edge 105, the bottom edge 106, and the left side edge 107) of the central panel 150 is mechanically coupled to a panel of OLEDs 102. In certain example embodiments, instead of a single central panel, there can be two or more panels that make up a central panel.

In addition to the outer perimeter (e.g., the top edge 104, the right side edge 105, the bottom edge 106, and the left side edge 107 of the central panel 150) of a panel, a panel can include one or more dividers 108 that separate two or more OLEDs within the panel. The outer perimeter and/or the dividers 108 of each panel can be made from one or more of a number of materials, including but not limited to metal, plastic, and fiberglass. Such portions of the panel can be made as a single piece (as from a mold) and/or as separate pieces that are mechanically coupled to each other using one or more coupling methods, including but not limited to welding, epoxy, compression fittings, mating threads, and fastening devices.

A top panel 110 of OLEDs 102 is mechanically coupled in FIG. 1 to the top edge 104 of the central panel 150. The top panel 110 has two OLEDs 102 in a 1×2 configuration. The OLEDs 102 of the top panel 110 are substantially the same size and shape as the OLEDs 102 in the central panel 150. The top panel 110 forms an angle with the central panel 150. In this case, the angle formed between the top panel 110 and the central panel 150 is approximately 135°. By forming an angle less than 180°, the light emitted from the OLEDs 102 in the central panel 150 and the top panel 110 can be directed toward a point.

In such a case, the light emitted by the OLEDs 102 of the central panel 150 and the top panel 110 can be concentrated for an increased amount of footcandles at a lower rate of power consumption compared to other light sources. Similarly, a right side panel 120, a bottom panel 130, and a left side panel 140 can be mechanically coupled to the central panel 150 along the right side edge 105, the bottom edge 106, and the left side edge 107, respectively. The OLEDs 102 of the right side panel 120, the bottom panel 130, and the left side panel 140 can have the same 1×2 configuration as the OLEDs 102 of the top panel 110. In addition, the OLEDs 102 of the right side panel 120, the bottom panel 130, and the left side panel 140 can have substantially the same size and/or shape as the OLEDs 102 of the top panel 110.

Further, the angle formed between the central panel 150 and each of the right side panel 120, the bottom panel 130, and the left side panel 140 can be substantially the same as the angle formed between the top panel 110 and the central panel 150. In certain example embodiments, the one or more of the angles formed between the central panel 150 and the other panels are fixed. In other words, the other panels can be fixedly coupled to the central panel 150. Alternatively, or in addition, one or more of the other panels can be hingedly coupled to the central panel 150. In such a case, the angle formed between the central panel 150 and a hingedly coupled panel can be adjusted manually, remotely, and/or automatically.

Generally, adjustments made to the lighting device 100 (or any other example lighting fixture described herein, if applicable) are made to create a target level of light at a target area. An adjustment of the lighting device 100 can be made to adjust the light output from the OLEDs 102 directed to a target area to a target level. As an example, an adjustment of the lighting device 100 can be made based on a diminished performance and/or failure of an OLED 102 in the lighting device 100 so that the lighting device 100 outputs a target level of light output to a target area. As another non-exclusive example, an adjustment of the lighting device 100 can be made to adjust, based on light emitted from other light sources (e.g., ambient light, another lighting device), the light output of the OLEDs 102 to achieve a target light at the target area.

In other words, the angle formed between the central panel 150 and a hingedly coupled panel is adjusted to adjust the optical efficiency of the lighting device 100. For example, when the angle formed between the central panel 150 and a hingedly coupled panel is adjusted (whether automatically or manually), the adjustment can be made in response to a loss in lumen output of the central panel 150 and/or the hingedly coupled panel. Such an adjustment can compensate for the loss in lumen output to provide an equivalent amount of light (as measured, for example, in footcandles) for a target area receiving the light output from the lighting device 100. The angle can also be adjusted regulate the output of the lighting device 100 in response to an amount of available natural and/or alternative light in order to achieve a target level of light received at a target area.

Adjustments to the lighting device 100 (or any other example lighting device described herein) can be made manually or automatically. When such adjustments are made automatically, a computer system as described below with respect to FIG. 10, can be used to determine the necessity of, and effectuate, such adjustments. An adjustment can involve physically moving one or more panels and/or adjusting the light output from one or more OLEDs 102 in the lighting device 100. Such adjustments can be made based on one or more of a number of factors, including but not limited to a sensing device (e.g., a photocell), a measuring device (e.g., a meter), a time of day, and a protocol.

When the angles formed between the central panel 150 and the other panels are fixed, the edges of all the panels can form a frame. In such a case, the frame of the light fixture 100 can be formed from a single piece. Alternatively, the frame can be formed by mechanically coupling the edges of the various panels together.

In certain example embodiments, each panel of the lighting fixture 100 shown in FIG. 1 has a thin profile. For example, the thickness of the central panel 150 may be less than 2.5 inches. Further, the weight of the lighting fixture 100 can be relatively low compared to fixtures using other light sources. For example, the lighting fixture 100 can weigh 10 pounds.

Figure 2A:
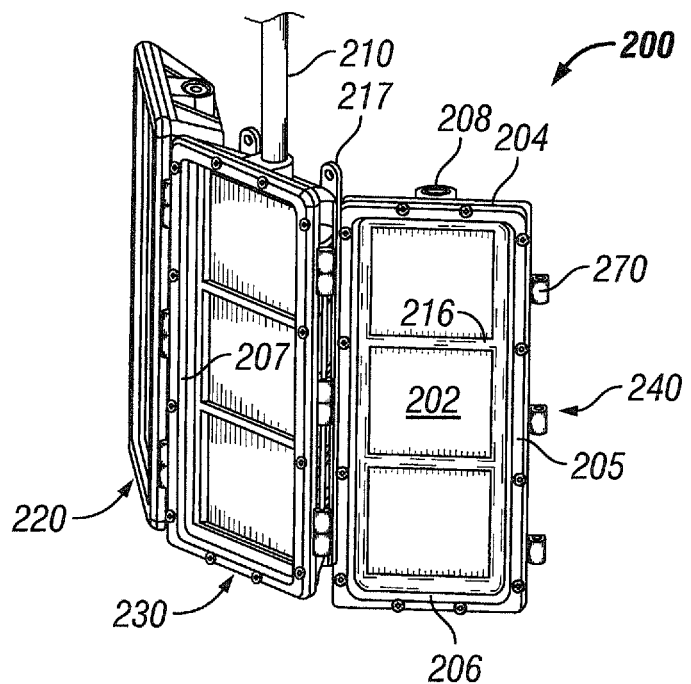
FIGS. 2A and 2B show various views of another example lighting device using OLEDs in accordance with certain example embodiments.
Figure 2B:
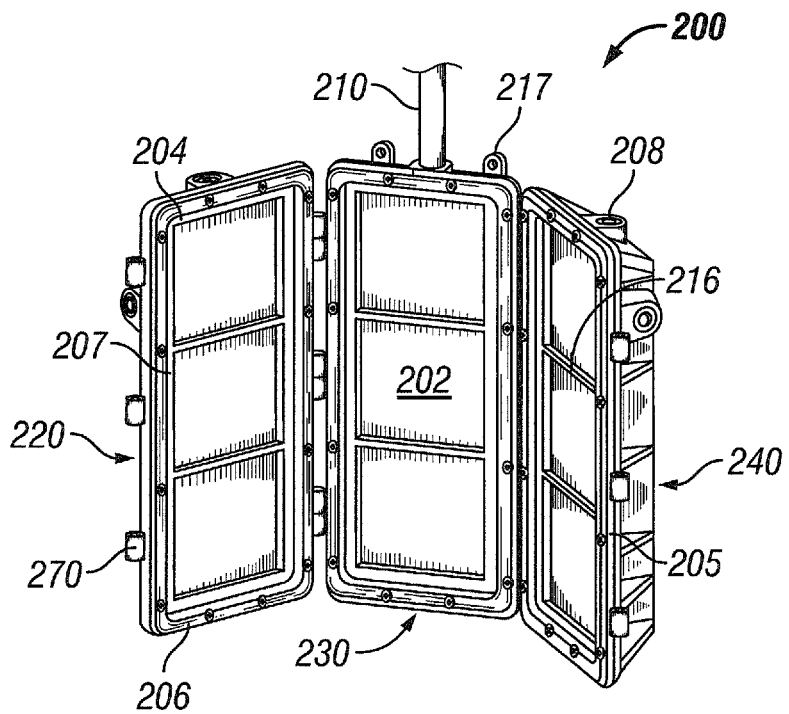

FIGS. 2A and 2B show another example lighting device 200 using OLEDs 202 in accordance with certain example embodiments. In one or more embodiments, one or more of the components shown in FIGS. 2A and 2B may be omitted, repeated, and/or substituted. Accordingly, embodiments of a lighting device should not be considered limited to the specific arrangements of components shown in FIGS. 2A and 2B.

Referring to FIGS. 1-2B, the lighting device 200 includes a central panel 230, a left side panel 220, and a right side panel 240 that each have substantially the same shape (rectangular) and size. The panels in FIGS. 2A and 2B are substantially similar to the panels of FIG. 1. Additional or different features of the panels in FIGS. 2A and 2B are described below.

Each of the central panel 230, the left side panel 220, and the right side panel 240 have three OLEDs 202 arranged in a 1×3 configuration. For each panel, the OLEDs 202 are separated by dividers 216, substantially similar to the dividers 108 described above with respect to FIG. 1. The OLEDs 202 shown in FIG. 2 are all substantially the same size and shape, although in certain example embodiments, the OLEDs 202 can have different sizes and/or shapes. Further, the shape and size of each panel can be different from the other panels and/or the OLEDs 202 within the respective panel.

Each panel can include one or more features disposed along one or more portions of the panel. For example, as shown in FIGS. 2A and 2B, each panel has hinge features 270 disposed along opposite sides (right side edge 205 and left side edge 207 and/or top edge 205 and bottom edge 206) of the panel. In certain example embodiments, the hinge features 270 (as well as, potentially, other coupling features described below) are used to mechanically couple one panel to another panel to create a modular assembly of panels. The hinge features 270 can be part of the side edges of the panel (as from a mold) and/or can be a separate piece that is mechanically coupled to the frame using one or more of a number of coupling methods, including but not limited to welding, epoxy, compression fittings, mating threads, and fastening devices.

The hinge features 270 can be offset from one side compared to the other side of the panel so that the hinge features 270 mate while the top and bottom surfaces of the two adjoining panels remain substantially level to each other. In such a case, each panel (e.g., central panel 230, left side panel 220) can be manufactured substantially the same. Thus, the panels can be modular and can be coupled to each other in a side-by-side and/or a top-to-bottom arrangement for any number of multiple panels. The hinge features 270 can, in some cases, use a fastening device (not shown) to mechanically couple the hinge features 270 together. An example of such a fastening device can include, but is not limited to, a pin that is slidably inserted into an aperture that traverses the length of each hinge feature 270.

The hinge features 270 allow the panels of the lighting fixture 200 to be mechanically adjustable to accommodate one or more conditions (e.g., lighting requirements, physical obstacles, failure of an OLED 202). The hinge features 270 allow two adjacent panels that are hingedly coupled to each other to form an angle relative to one another. Such an angle can be greater than 0° and less than 360°.

As another example of a feature, each panel can have one or more mounting features 217 disposed along an edge (e.g., the top edge 204, as shown in FIGS. 2A and 2B) and/or the back side (not shown) of the panel. In certain example embodiments, the mounting features 217 can be used to mechanically mount a panel to a mounting surface (e.g., a wall, a pole, a u-bracket). The mounting features 217 can be part of the top edge 204 of the panel (as from a mold) or can be a separate piece that is mechanically coupled to the frame of the panel using one or more of a number of coupling methods, including but not limited to welding, epoxy, compression fittings, mating threads, and fastening devices. The mounting features 217 can, in some cases, use a fastening device (not shown) to mechanically couple a mounting feature 217 to a mounting surface. Examples of such a fastening device can include, but are not limited to, a bolt, a clamp, and a slot.

In addition, or in the alternative, a panel can include one or more hanging features 208. In certain example embodiments, the hanging features 208 can be used to mechanically suspend a panel from a suspension feature (e.g., a pole (as with the pole 210 in FIGS. 2A and 2B), a conduit, an I-beam). The hanging feature 208 can be used to change the orientation and/or direction of the panel in a vertical and/or in a horizontal direction. In certain example embodiments, the pole 210 is also a conduit through which a cable providing power and/or control signals for the lighting fixture 200 can be disposed.

Such a hanging feature 208 can also be disposed along an edge (e.g., the top edge 204, as shown in FIGS. 2A and 2B) and/or the back side (not shown) of the panel. The hanging feature 208 can be part of the side edges of the panel (as from a mold) or can be a separate piece that is mechanically coupled to the frame using one or more of a number of coupling methods, including but not limited to welding, epoxy, compression fittings, mating threads, and fastening devices. The hanging feature 208 can, in some cases, use a securing device (not shown) to mechanically couple to and secure a hanging feature 208 to a suspension surface (e.g., a ceiling, a wall, an I-beam). Examples of such a securing device can include, but are not limited to, a bolt, a clamp, a pressure fitting, and a slot. The orientation of the central panel 230 (or any other panel coupled to the pole 210 and/or surface coupled to the hanging feature 208) can be fixed by a set screw, a clamp, and/or any other type of fastening device.

As described above, the power used to illuminate the OLEDs 202 can come from one or more of a number of sources. For example, the power can be generated by a battery located within the left side panel 220. As another example, the power can be generated by a cable that is fed to the central panel 230 through the pole 210. When two panels (e.g., (e.g., the central panel 230 and the left side panel 220) are mechanically coupled to each other, power can be transferred from one panel (where a source of power is located) to the other panel (where no source of power is located) in one or more of a number of ways. For example, power can be transferred from one panel to the other panel through the hinge features 270. As another example, power can be transferred from one panel to the other panel using inductive power transmission.

While example embodiments described herein are directed to OLEDs 202, such embodiments can be used with one or more of a number of other types of light sources, including but not limited to LED, incandescent, halogen, compact fluorescent, and metal halide. Thus, example embodiments described herein with respect to FIGS. 2A and 2B should not be considered limited to OLEDs.

Figure 3:
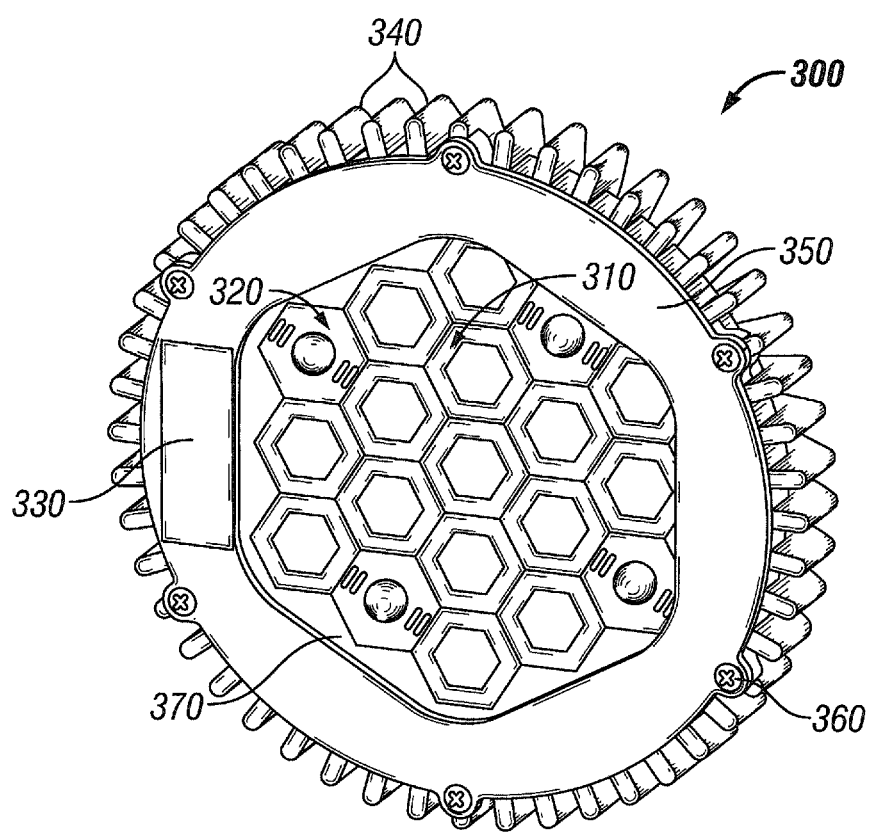
FIG. 3 shows yet another example lighting device using OLEDs in accordance with certain example embodiments.

FIG. 3 shows yet another example lighting device 300 using OLEDs 310 in accordance with certain example embodiments. Specifically, the lighting device 300 includes a number of LEDs 320 and OLEDs 310 that are disposed on the same mounting surface 370 (e.g., a printed circuit board (PCB)). In one or more embodiments, one or more of the components shown in FIG. 3 may be omitted, repeated, and/or substituted. Accordingly, embodiments of a lighting device should not be considered limited to the specific arrangements of components shown in FIG. 3.

Referring to FIGS. 1-3, as with the OLEDs 310, the LEDs 320 can be any type of LED system including, but not limited to, discrete LEDs, LED arrays, chip-on-board LEDs, edge lit LED panels, and surface mounted LEDs. The LEDs 320 can emit light in one or more colors or can be a combination of LEDs wherein a portion of the LEDs emit light in one color, such as white, and another portion of the LEDs emit light in a second color different from the first, such as red, blue, green, or amber. The LEDs 320 can also be of any shape, size, and brightness.

In this example, the LEDs 320 and the OLEDs 310 have substantially the same hexagonal shape and are of substantially the same size. The LEDs 320 and the OLEDs 310 are arranged consecutively in a honeycomb configuration that spans most of the mounting surface 370. The mounting surface 370 is mounted within a frame 350. The frame 350 can be made of a thermally conductive (e.g., metal) and/or a thermally non-conductive (e.g., plastic) material. In certain example embodiments, one or more protruding features 340 can be disposed on the outer perimeter of the frame 350. Such protruding features 340 (e.g., heat sink fins) can be made of thermally conductive material and are used to dissipate heat generated by the LEDs 320. The protruding features 340 and the frame 350 can be made as a single piece (as from a mold) and/or as separate pieces that are mechanically coupled to each other using one or more coupling methods, including but not limited to welding, epoxy, compression fittings, mating threads, and, as shown in FIG. 3, fastening devices 360.

In certain example embodiments, the source providing power and/or control to the LEDs 320 is different than the source providing power and/or control to the OLEDs 310. For example, as shown in FIG. 3, an optional LED driver 330, also mounted within the frame 350, can be used to provide power and control to the LEDs 320. Such a LED driver 330 may be used, for example, when the LEDs 320 operate on a certain level of alternating current (AC) or direct current (DC) power.

The optional LED driver 330 can be electrically coupled to, and receive power from, a separate source of power (e.g., 120 VAC circuit, a battery). The LED driver 330 can include one or more components to process the power it receives. One such component of the LED driver 330 can be a low frequency AC/DC converter that is electrically coupled to the power source. In such a case, the power received from the power source by the low frequency AC/DC converter may be transformed, rectified, inverted, converted, and/or otherwise manipulated so that the output of the low frequency AC/DC converter is in an appropriate form (e.g., DC, AC) and of an appropriate level (e.g., 24 VDC, 120 VAC) to operate the remainder of the LED driver 330 and/or the LEDs 320. For example, the low frequency AC/DC converter can convert input AC power received from a power source to DC power. The LED driver 330 can deliver AC power at any frequency including, but not limited to, 50 Hz and 60 Hz. In certain example embodiments, the LED driver 330 includes a diode bridge.

The LED driver 330 can also include an inverter that is electrically coupled to the low frequency AC/DC converter. The inverter can control and/or regulate voltage and/or current flowing through the LEDs 320. The inverter may convert one DC voltage and/or current into an AC voltage and/or current. The inverter may include one or more components including, but not limited to, an integrated circuit, a timer, an inductor, a diode, a transistor, and a resistor. The components of the inverter may be positioned and interconnected, either mechanically or electrically, in one or more of a number of configurations. Examples of such an inverter can include, but are not limited to, a half-bridge inverter, a push-pull inverter, a boost inverter, a buck-boost inverter, and a buck inverter.

The power source for the OLEDs 310 can be fed by relatively simpler circuitry compared to the LED driver 330. For example, the OLEDs 310 can be fed directly by a 120 VAC power feed, without the need to invert, convert, transform, or otherwise manipulate the 120 VAC power feed. As another example, the OLEDs 310 can be fed by a battery (not shown).

In certain example embodiments, the OLEDs 310 can be used to provide emergency back-up lighting when the LED 320 are dimmed or off. When LEDs 320 are operated at dimmed levels, the effectiveness of the LEDs 320 can be diminished. For example, if a dimmer switch controlling the LEDs 320 is set for 50%, the actual light output of the LEDs 320 can be different than 50%. As a result, in some cases, one or more LEDs 320 within the lighting fixture 300 are turned off completely while the remaining LEDs 320 are dimmed to the level designated by the dimmer setting. In such a case, the light pattern generated by the lighting source 300 is altered, often causing spotting effects, altering the photomertrics, or creating some other lighting anomaly.

By using example embodiments, the OLEDs 310 can be activated in such situations to both generate an amount of light that corresponds to the dimmer setting and create a more even distribution of light emitted by the light source 300. By having a separate source to power and/or control for the OLEDs 310, the OLEDs 310 can be used to fill the imperfections of the dimmed LEDs 320 independent of the power and/or control feed for the LEDs 320.

In certain other example embodiments, the OLEDs 310 can be used as a back-up to the LEDs 320. For example, if the LEDs 320 are off (e.g., loss of power, LED 320 failure, dimmer level too low for the LED 320 to operate), then the OLEDs 310 turn on. In such a case, the OLEDs 310 can use the same power source as the LEDs 320 and/or a different power source (e.g., a battery). In addition, the OLEDs 310 can operate under the control of the LED driver 330 or independently of the LED driver 330.

Figure 4A:
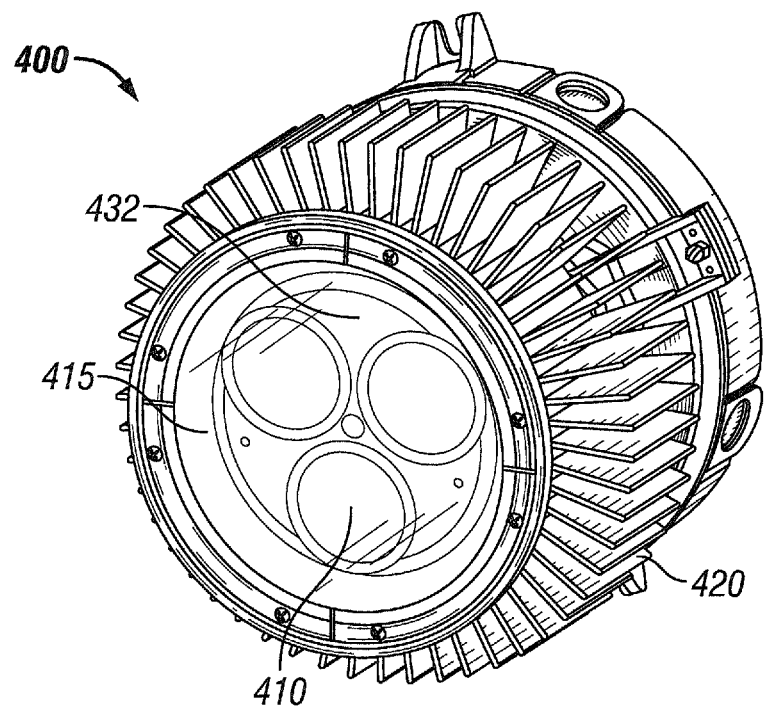
FIGS. 4A and 4B show still another example lighting device using OLEDs in accordance with certain example embodiments.
Figure 4B:
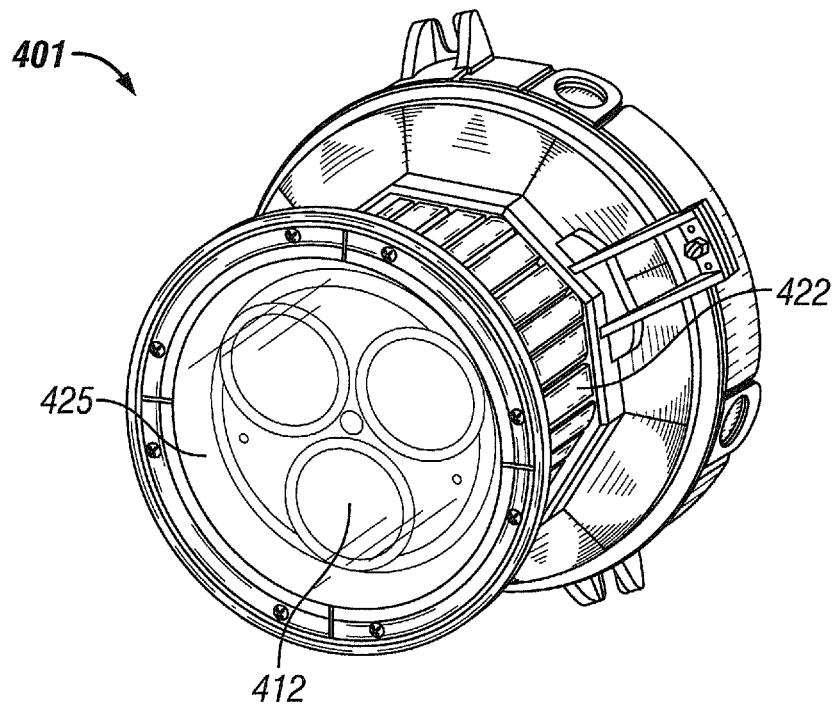

FIGS. 4A and 4B show one of the benefits of using example OLEDs in place of traditional lighting sources for a lighting fixture. Specifically, FIG. 4A shows a lighting fixture 400 using LEDs 410, while FIG. 4B shows a revised version of the lighting fixture 401 using OLEDs 412 in accordance with certain example embodiments. In one or more embodiments, one or more of the components shown in FIGS. 4A and 4B may be omitted, repeated, and/or substituted. Accordingly, embodiments of a lighting fixture should not be considered limited to the specific arrangements of components shown in FIGS. 4A and 4B.

Referring to FIGS. 4A and 4B, the LEDs 410 can be mounted to a light source platform 432. Such a light source platform 432 can include, but is not limited to, a circuit board, a substrate, and a mounting platform. The OLEDs 412 can also be mounted to a light source platform 434. The light source platform 434 on which the OLEDs 412 are disposed can be the same or different than the light source platform 432 on which the LEDs 410 are disposed.

In FIG. 4A, because the LEDs 410 generate a high amount of heat when illuminated, particularly when covered by a lens 415 or otherwise enclosed, a number of features are added to the lighting fixture 400. For example, a number of protrusions 420 (e.g., heat sink fins) can surround at least a portion of the lighting fixture 400 proximate to the LEDs 410 and extend radially away from the LEDs 410. The protrusions 420 can be made of a thermally conductive material. In such a case, the protrusions 420 absorb heat generated by the LEDs 410 and dissipate the heat into the atmosphere.

By including such features as protrusions 420 with the lighting fixture 400, added cost, weight, size, construction, and maintenance difficulty are increased. Because OLEDs 412 distribute light and heat more evenly over the surface of the OLED 412, the lighting fixture 401 of FIG. 4B using the OLEDs 412 can operate at higher temperatures and have higher temperature ratings. For example, using OLEDs 412 with the lighting fixture 401 can allow for a higher maximum ambient temperature (e.g., below 85° C.) of the external lens 425 of the lighting fixture 401, which translates to a higher rating (e.g., T6 rating) for the lighting fixture 400 compared to the rating that the lighting fixture 400 can achieve. As another example, using OLEDs 412 with the lighting fixture 401 can allow for a higher maximum temperature for the outer surface of the OLEDs 412. As a result, for example, the lighting fixture 401 can qualify under UL844, where the lighting fixture 400 cannot. In certain example embodiments, the lens 425 of the lighting fixture 401 is optional. When a lens 425 is part of the lighting fixture 401, the lens 425 can cover the OLEDs 412 and, in some cases, diffuse the light emitted by the OLEDs 412.

As a result of the higher temperature ratings, the lighting fixture 401 using the OLEDs 412 can utilize a more compact design, allow the lens 425 to be closer to the OLEDs 412, reduce or eliminate certain features such as the protrusions 420 to allow for a lower profile portion 422 of the lighting fixture 401, and/or provide a number of other benefits when compared to the lighting fixture 400 using the LEDs 410. In addition, the lighting fixture 401 with the OLEDs 412 can be used in a high-temperature environment (e.g., areas that have higher ambient temperature (e.g., 75° C.)) compared to the lighting fixture 400 with the LEDs 410, which allows a user more flexibility as to where to place the lighting fixture 401. In certain example embodiments, the lighting fixture 401 can also operate at temperatures as low as −55° C.

In certain example embodiments, one or more OLEDs can be used to provide accent lighting or task lighting for certain devices and/or in certain applications. For example, OLEDs can be used in conjunction with electrical enclosures. Electrical enclosures can be any type of enclosure, including but not limited to, explosion-proof enclosures, electrical connectors, junction boxes, control panels, lighting panels, motor control centers, switchgear cabinets, and relay cabinets. In addition, example embodiments may be used with electrical enclosures that meet one or more standards. For example, an electrical enclosure can be a hose-tight enclosure (e.g., an enclosure meeting National Electrical Manufactures Association (NEMA) 4 standards). In such a case, the enclosure is constructed to provide a degree of protection against, at least, falling dirt, rain, sleet, snow, windblown dust, splashing water, and hose-directed water.

In one or more example embodiments, an explosion-proof enclosure (also known as a flame-proof enclosure) is an enclosure that is configured to contain an explosion that originates inside the enclosure. Further, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A flame path may be a mating of any two or more surfaces. Each surface of a flame path may be any type of surface, including but not limited to a flat surface, a threaded surface, and a serrated surface.

In one or more example embodiments, an explosion-proof enclosure is subject to meeting certain standards and/or requirements. For example, the NEMA sets standards by which an enclosure must comply in order to qualify as an explosion-proof enclosure. Specifically, NEMA Type 7, Type 8, Type 9, and Type 10 enclosures are subject to NEMA standards by which an explosion-proof enclosure positioned within a hazardous location must comply. For example, a NEMA Type 7 standard applies to enclosures constructed for indoor use in certain hazardous locations. Hazardous locations may be defined by one or more of a number of authorities, including but not limited to the National Electric Code (e.g., Class 1, Division I) and Underwriters' Laboratories, Inc. (e.g., UL 698). For example, a Class 1 hazardous area under the National Electric Code is an area in which flammable gases or vapors may be present in the air in sufficient quantities to be explosive.

As a specific example, NEMA standards for an explosion-proof enclosure of a certain size or range of sizes may require that in a Group B, Division 1 area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference.

FIG. 5 shows a cross-sectional top view of an example electrical enclosure 500 using at least one OLED 516 in accordance with certain example embodiments. In one or more embodiments, one or more of the components shown in FIG. 5 may be omitted, repeated, and/or substituted. Accordingly, embodiments of an electrical enclosure should not be considered limited to the specific arrangements of components shown in FIG. 5. Referring to FIG. 5, the electrical enclosure 500 includes a cover 504 and a body 502. The body 502 forms a cavity 530. The cover 504 (which may also be called a door) has an aperture inside of which is mounted a viewing assembly 540.

The viewing assembly 540 includes a circuit indicating plate 510, a viewing channel 512, a lens 514, at least one OLED 516, and a device. The device can be any item that a user may want to view from outside the enclosure 500 when the cover 504 is coupled to the body 502. Examples of a device can include, but are not limited to, a display, an indicating light, and a gauge. In this case, the device is a PCB 518 mounted to a plate 520. The viewing assembly 540 allows a user looking at the cover 504 when the enclosure is closed to see some of all of the PCB 518. Specifically, the OLED 516 can be clear and transparent, even when illuminated, which allows the OLED 516 to act as a viewing window in addition to providing illumination directed toward the PCB 518. In such a case, the lens 514 acts as a protective window to prevent the OLED 516 from being damaged by an object outside the electrical enclosure 500. The PCB 518 can include various information, including but not limited to a circuit number.

The OLED 516 can operate (be illuminated) continuously, based on the position of a manual switch, based on a condition detected by a sensor (e.g., motion sensor, infrared sensor), and/or based on some other condition and/or device. In certain example embodiments, the electrical enclosure 500 is an explosion-proof enclosure. In such a case, a flame path 522 exists where the plate 520 mechanically couples to the cover 504. Regardless of the type of electrical enclosure, the OLED 516 can be integrated into the cover 504 of the electrical enclosure 500 without increasing the dimensions (e.g., thickness) of and/or adding features (e.g., slot, pocket) to the cover 504.

FIG. 6 shows a different application of an OLED 626 within an electrical enclosure 600. In one or more embodiments, one or more of the components shown in FIG. 6 may be omitted, repeated, and/or substituted. Accordingly, embodiments of an electrical enclosure should not be considered limited to the specific arrangements of components shown in FIG. 6. Referring to FIG. 6, the electrical enclosure 600 has no viewing window. Rather, the OLED 626 is mounted within an optional pocket 622 on the inner surface 621 of a wall 610 inside the enclosure 600. A protective lens 624 may be mechanically coupled to the OLED 626, sitting substantially flush with the inner surface 621 of the wall 610, to protect the OLED 626. The device 602 that the OLED 626 illuminates can be mounted on the same wall 610 as the OLED 626 or a different wall inside the electrical enclosure 600. A grouping of wires 604 can be used to electrically couple the device 602 to the OLED 626 and/or to other devices inside or outside of the electrical enclosure 600.

The OLED 626 can be coupled to the inner surface 621 of the wall 610 in one or more of a number of ways. For example, the OLED 626 can be fixedly coupled to the inner surface 621. As another example, the OLED 626 can be moveably (e.g., hingedly, rotatably, slidably) coupled to the inner surface 621 so that the OLED 626 can be moved. For example, the OLED 626 can rotate around one or more axes. As another example, the OLED 626 can be removeably coupled, as when a magnet is fixedly coupled to the back side of a lighting assembly 620, which can include the OLED 626, a battery, and the lens 624.

FIG. 7 shows yet another different application of an OLED 720 within an electrical enclosure 700. In one or more embodiments, one or more of the components shown in FIG. 7 may be omitted, repeated, and/or substituted. Accordingly, embodiments of an electrical enclosure should not be considered limited to the specific arrangements of components shown in FIG. 7. Referring to FIG. 7, the electrical enclosure 700 can be a receptacle (e.g., a female portion of an electrical connector). The electrical enclosure 700 includes a base 740 and a collar 730. The base 740 has mounted thereto a connector end 710, in this case a female end of a 4-pin connector. In certain example embodiments, the base 740 has a lipped extension 742 that extends away from a backplate 744 of the base 740 for a short distance.

The extension 742 has a shape substantially similar to the shape of the collar 730 so that the collar 730 can slidably couple to the extension 742.

The collar 730 can be fixedly and/or removably coupled to the extension 742 of the base 740 and can extend outward from the base 740. The collar 730 can be shaped in such a way as to receive the male portion (not shown) of the connector and relieve strain on the actual pins and pin receivers when the male and female portions of the connector are mechanically coupled to each other by extending beyond the female portion and interlocking with a portion of the male connector.

In certain example embodiments, the collar 730 has a perimeter large enough to provide a gap between the inner surface of the collar 730 and the connector end 710 when the connector end 710 is mechanically coupled to the base 740. In such a case, a OLED 720 can be mounted to the inner surface of the collar 730 (within the gap) to provide light inside the collar 730 to allow a user to see within the cavity (including the connector end 710) formed by the collar 730.

The example electrical enclosure 700 with the OLED 720 mounted therein can have one or more of a number of benefits. For example, when the connector end 710 is a keyway, the OLED 720 can be mounted on the collar 730 to illuminate the connector end 710 so that a key that mechanically couples to the connector end 710 is properly oriented. As another example, when the connector end 710 is one end of an electrical connector (as shown in FIG. 7), the OLED 720 can be mounted on the collar 730 to illuminate at least one portion of the electrical connector so that the polarity of a corresponding connector (the other portion of the electrical connector) is properly oriented when the corresponding connector mechanically couples to the electrical connector.

Using LEDs and other types of light sources is difficult, if not impossible, to use in certain types of light fixtures. For example, encapsulated lighting fixtures are permanently sealed with a light source encased inside the fixture. Encapsulation provides a level of protection of the contents of a lighting fixture. In addition, by hermetically sealing the encapsulated lighting fixture, the contents of the encapsulated lighting fixture are protected from moisture and other corrosive elements.

If an encapsulated lighting fixture is breached (for example, to replace a light source), a great deal of effort is required to put the encapsulated lighting fixture back in its original state with regard to the encapsulation. When LEDs and other types of heat-generating light sources are used in an encapsulated lighting fixture, the light source and/or other elements within the encapsulated lighting fixture can fail because of the heat generated by the light source and retained within the encapsulated lighting fixture.

Figure 8A:
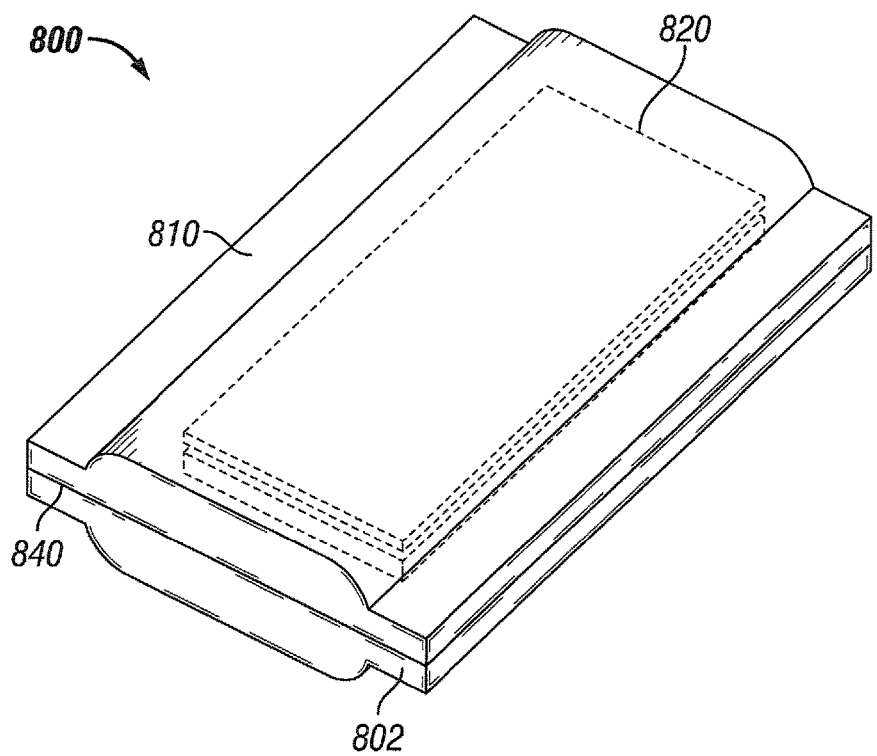
FIGS. 8A and 8B show various view of an encapsulated lighting fixture using OLEDs in accordance with certain example embodiments.
Figure 8B:
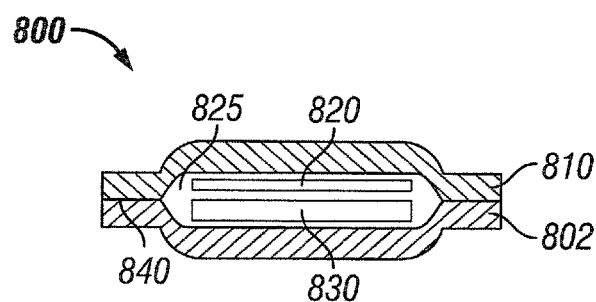

FIGS. 8A and 8B show an example encapsulated lighting fixture 800 that uses OLEDs 820 in accordance with certain example embodiments. Specifically, FIG. 8A shows a top perspective view of the encapsulated lighting fixture 800, and FIG. 8B shows a cross-sectional side view of the encapsulated lighting fixture 800. In one or more embodiments, one or more of the components shown in FIGS. 8A and 8B may be omitted, repeated, and/or substituted. Accordingly, embodiments of an encapsulated lighting fixture should not be considered limited to the specific arrangements of components shown in FIGS. 8A and 8B.

Referring to FIGS. 8A and 8B, the encapsulated lighting fixture 800 includes a cover 810, a housing 802, a power supply 830, at least one OLED 820, and optionally a power cord 840. In certain example embodiments, the encapsulated lighting fixture 800 is hermetically sealed. The housing 802 of the encapsulated lighting fixture 800 has a concavely curved surface and/or multiple surfaces that form a cavity 825. The perimeter of the housing 802 has a flange (mating surface) that mechanically couples to a lens 810. The housing 802 can be made of a non-metallic material. For example, the housing 802 can be made of plastic, resin, nylon, and/or a polymer.

The lens 810 can be of any shape and/or size, but the mating surface of the lens 810 substantially corresponds, at junction 840, to the flange of the housing 802. In certain example embodiments, the lens 810 and the housing 802 are mechanically coupled to each other at junction 840 in such a way as to encapsulate the cavity 825. The junction 840 can be sealed in one or more of a number of ways to create the encapsulated cavity 825. Examples of such sealing methods include, but are not limited to, friction welding, epoxy, soldering, and heat fusion. The junction 840 can traverse the entire perimeter of the flange of the housing 802 and the mating surface of the lens 810.

In certain example embodiments, the power supply 830 and at least one OLED 820 is disposed within the encapsulated cavity 825. The power supply 830 can be mechanically coupled to the housing 802 and electrically coupled to the at least one OLED 820. The power supply 830 can be a battery and/or a device that receives power from an external power source. In the latter case, a conductor 840 can traverse an aperture in the housing 802, without compromising the hermetic environment within the cavity 825, to electrically couple to a power source located outside the housing 802. The OLED 820 can be positioned proximate to the lens 810 so that the light emitted by the OLED 820 is properly diffused by the lens 810.

By having an example encapsulated lighting fixture 800 with OLEDs 820 as a light source, the cost of the encapsulated lighting fixture 800 can be very low compared to an encapsulated lighting fixture using another light source, such as a LED, while the reliability and expected hours of usage would be relatively high. In such a case, the encapsulated lighting fixture 800 could be disposable when the OLEDs 820 eventually cease functioning.

In addition, encapsulating the cavity 825 could further improve the temperature rating of the encapsulated lighting fixture 800. Specifically, because the cavity 825 is encapsulated, the temperature measurement of the encapsulated lighting fixture 800 is taken at an exterior surface of the encapsulated lighting fixture 800. Because the heat generated by the OLED 820 is substantially evenly distributed over the OLED 820, the internal temperature, translated to an external surface of the encapsulated lighting fixture 800, can be reduced relative to a similar encapsulated lighting fixture using LEDs or other light sources. This aspect can be particularly beneficial when placing the encapsulated lighting fixture 800 in a hazardous environment.

Figure 9:
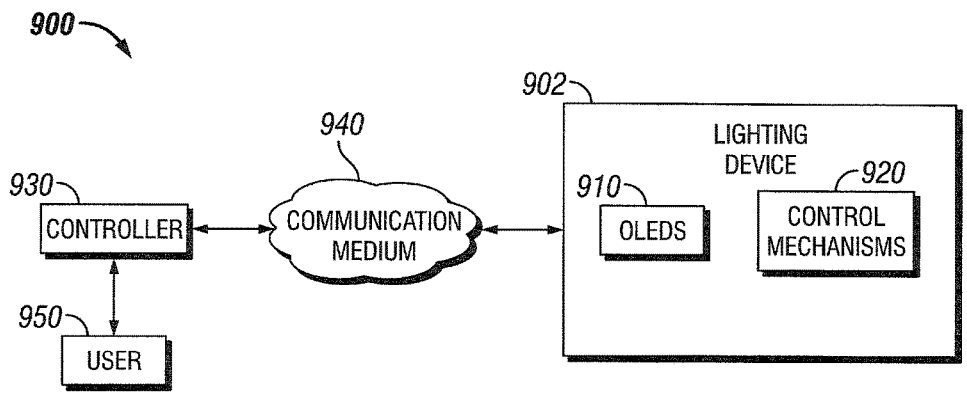
FIG. 9 shows a block diagram of a lighting system using OLEDs in accordance with certain example embodiments.

FIG. 9 shows a block diagram of a lighting system 900 using OLEDs 910 in accordance with certain example embodiments. In one or more embodiments, one or more of the components shown in FIG. 9 may be omitted, repeated, and/or substituted. Accordingly, embodiments of a lighting system should not be considered limited to the specific arrangements of components shown in FIG. 9.

Referring to FIGS. 1-9, the lighting system 900 includes a lighting device 902 that includes one or more OLEDs 910 and one or more control mechanisms 920. The lighting system 900 can also include a controller 930 that is communicably coupled to the light fixture 902 using a communication medium 940. Further, a user 950 can be communicably coupled to the controller 930. The OLEDs 910 and lighting device 902 are substantially similar to the OLEDs and lighting devices described above.

In certain example embodiments, one or more portions and/or features of the lighting device 902 can be controlled using one or more controller systems. A controller system can include the controller 930 and the one or more control mechanisms 920. A control mechanism 920 can be an electro-mechanical device (also called a motorized control device), including but not limited to a motor, a hydraulic system, and a pneumatic system. A control mechanism 920 can also be a switch, gate, or other means of electrical control. The control mechanisms 920 can communicate with (e.g., send signals to, receive signals from, receive power and/or control from) the controller 930 using wired and/or wireless technology. Some or all of the control mechanisms 920 can operate using hardware and/or software. A control mechanism 920 can correspond to a computer system as described below with regard to FIG. 10.

The controller 930 can include one or more components that are operatively coupled to (e.g., electrically coupled, communicably coupled, mechanically coupled, hydraulically coupled), directly and/or remotely, the control mechanisms 920 of the lighting fixture 902 and operate using hardware and/or software. Examples of components of the controller 930 can include, but are not limited to, a user interface (e.g., a dimmer switch, a control switch, a dial, a computer), a programmable logic controller, a control algorithm, an electro-magnetic solenoid, a motor, a current measuring device, and a sensor (e.g., a photocell, a motion sensor). The controller 930 can communicate with (e.g., send signals to, receive signals from, send power and/or control to) the control mechanisms 920 using wired and/or wireless technology. In certain example embodiments, some or all of the controller 930 is part of one or more of the control mechanisms 920. The controller 930 can correspond to a computer system as described below with regard to FIG. 10.

When the controller 930 communicates with the control mechanisms 920, a communication medium 940 can be used. The communication medium 940 can be one or more of a number of platforms used for communication. Such platforms can include, but are not limited to wires (e.g., conductors, cables), light signals, audio signals, and digital signals. For example, the communication medium 940 can include a network (e.g., Internet, Intranet, Extranet, Local Area Network (LAN), Wide Area Network (WAN)) that uses wireless and/or wired technology. In certain example embodiments, the controller 930 and the control mechanisms 920 have the appropriate communication protocols in order to communicate with each other using the communication medium 940.

The controller 930 can be used to automatically adjust the light output of the OLEDs 910 and/or the direction (e.g., tilt, angle) of all or a portion (e.g., one or more panels) of the lighting fixture 902. For example, a controller 930 can be used to automatically adjust the dimming level of one or more OLEDs 910 of the lighting fixture 902 in response to natural light and/or motion activity. As another example, the controller 930 can automatically adjust the dimming level of one or more OLEDs 910 and/or the orientation of one or more portions of the lighting fixture 902 to optimize power consumption for a desired footcandle of brightness for a particular location being illuminated by the lighting fixture 902.

As yet another example, the controller 930 can be used to automatically adjust the output level of one or more OLEDs 910 and/or the orientation of one or more portions of the lighting fixture 902 to compensate for a failed OLED 910 and/or panel. The controller 930 can operate based on manual input (e.g., physically moving a panel) from a user 950, based on control signals (e.g., as from a dimmer switch) generated by a user 950, based on based on input from one or more sensing devices, and/or based on some other factor. In the case of input from a sensing device, a sensing device can include, but is not limited to, a photocell, a motion sensor, a temperature sensor, and an OLED failure detector.

In certain exemplary embodiments, the user 950 is communicably coupled to the controller 930. The user 950 can be any person that interacts with the lighting system 900. Examples of a user 950 can include, but are not limited to, a homeowner, a business owner, a landlord, an electric distribution company, an electric transmission company, a public utility, a load management system, an engineer, an electrician, an instrumentation and controls technician, a mechanic, an operator, a consultant, a contractor, and a manufacturer's representative.

A user 950 can communicate with the controller 930 using a physical interaction (e.g., touching a touch pad on the controller 930) and/or using a user system (not shown). In cases where the user 950 uses a user system to communicate with controller 930, the user system can use wired and/or wireless technology. The user software of a user system can interact with the controller 930 using a browser extension. In certain example embodiments, the user system is, or contains a form of, an Internet-based or an intranet-based computer system that is capable of communicating with the software of the controller 930. Such a computer system can include any type of computing device and/or communication device. Examples of the user system can include, but are not limited to, a desktop computer with Internet or intranet access, a laptop computer with Internet or intranet access, a smart phone, a server, a server farm, and a personal digital assistant (PDA). The user system can correspond to a computer system as described below with regard to FIG. 10.

Further, as discussed above, the user system and/or controller 930 can each have corresponding software (e.g., user software and controller software, respectively). The user software and controller software can execute on a separate device (e.g., a server, mainframe, desktop personal computer (PC), laptop, personal desktop assistant (PDA), television, cable box, satellite box, kiosk, telephone, mobile phone, or other computing devices) from the user 195 and/or the controller 930 and can be coupled by a communication medium, such as a network (e.g., Internet, Intranet, Extranet, Local Area Network (LAN), Wide Area Network (WAN), or other network communication methods), with wire and/or wireless segments according to some exemplary embodiments. The user software can also be part of, or operates separately but in conjunction with, the controller 930.

In one or more exemplary embodiments, one or more of the user software and controller software displays web page(s) (i.e., web content). More specifically, the user software and controller software is any software capable of rendering Hypertext Markup Language (HTML) in one or more exemplary embodiments. For example, the user software and controller software is a web browser(s) used by the corresponding system to access web pages (i.e., web content) over the Internet (or other Wide Area Network or Local Area Network). One or more of the user software and controller software also displays data in other formats, including but not limited to JavaScript®, JavaScript® Object Notation (JSON) and XML. (JavaScript is a registered trademark and service mark of Oracle America, Inc. of Redwood Shores, Calif.)

Figure 10:
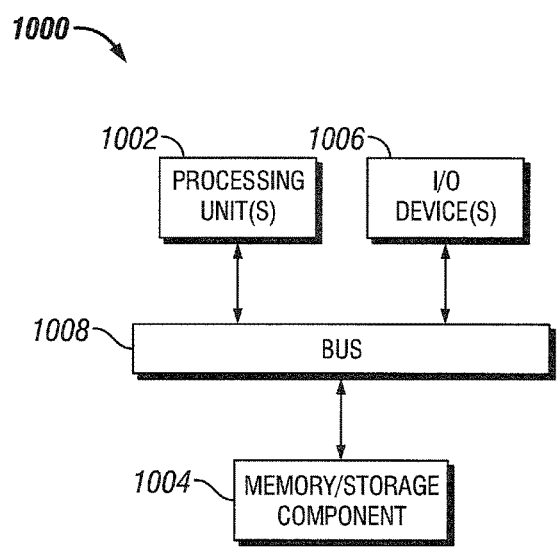
FIG. 10 shows a computer system used to control a lighting system using OLEDs in accordance with certain exemplary embodiments.

FIG. 10 illustrates one embodiment of a computing device 1000 capable of implementing one or more of the various techniques described herein, and which may be representative, in whole or in part, of the elements described herein. Computing device 1000 is only one example of a computing device and is not intended to suggest any limitation as to scope of use or functionality of the computing device and/or its possible architectures. Neither should computing device 1000 be interpreted as having any dependency or requirement relating to any one or combination of components illustrated in the example computing device 1000. As shown in FIG. 10, the bus 1008 is operatively coupled to each of the processing unit(s) 1002, the I/O device(s) 1006, and the memory/storage component 1004.

Computing device 1000 includes one or more processors or processing units 1002, one or more memory/storage components 1004, one or more input/output (I/O) devices 1006, and a bus 1008 that allows the various components and devices to communicate with one another. Bus 1008 represents one or more of any of several types of bus structures, including a memory bus or memory controller, a peripheral bus, an accelerated graphics port, and a processor or local bus using any of a variety of bus architectures. Bus 1008 can include wired and/or wireless buses.

Memory/storage component 1004 represents one or more computer storage media. Memory/storage component 1004 may include volatile media (such as random access memory (RAM)) and/or nonvolatile media (such as read only memory (ROM), flash memory, optical disks, magnetic disks, and so forth). Memory/storage component 1004 can include fixed media (e.g., RAM, ROM, a fixed hard drive, etc.) as well as removable media (e.g., a Flash memory drive, a removable hard drive, an optical disk, and so forth).

One or more I/O devices 1006 allow a customer, utility, or other user to enter commands and information to computing device 1000, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 1000 may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 1000 includes at least the minimal processing, input, and/or output means necessary to practice one or more embodiments.

Further, those skilled in the art will appreciate that one or more elements of the aforementioned computer device 1000 may be located at a remote location and connected to the other elements over a network. Further, one or more exemplary embodiments may be implemented on a distributed system having a plurality of nodes, where each portion of the implementation (e.g., the controller 930, the control mechanisms 920) may be located on a different node within the distributed system. In one or more embodiments, the node corresponds to a computer system. Alternatively, the node may correspond to a processor with associated physical memory. The node may alternatively correspond to a processor with shared memory and/or resources.

Using OLEDs in example lighting fixtures and electrical enclosures as described herein increases efficiency by reducing heat loss of energy. As a result, the efficiency of the example lighting fixtures and electrical enclosures using OLEDs can reduce material costs, reduce construction and maintenance time and costs, increase efficiency, and increase flexibility of use. Accordingly, many modifications and other embodiments set forth herein will come to mind to one skilled in the art to which OLEDs and their use in such devices as lighting fixtures and electrical enclosures pertain having the benefit of the teachings presented in the foregoing descriptions and the associated drawings. Therefore, it is to be understood that lighting fixtures and/or electrical enclosures using OLEDs are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A lighting device, comprising:
  a plurality of light-emitting diodes (LEDs) disposed on a mounting surface, wherein the plurality of LEDs are illuminated using a first power source; and
  a plurality of organic LEDs (OLEDs) disposed on the mounting surface, wherein the plurality of OLEDs are illuminated using a second power source,
  wherein the plurality of OLEDs are illuminated when the plurality of LEDs are not illuminated.

2. The lighting device of claim 1, wherein the plurality of OLEDs are further illuminated when at least one of the plurality of LEDs is dimmed.

3. The lighting device of claim 1, wherein the plurality of OLEDs are further illuminated when at least one of the plurality of LEDs is illuminated.

4. The lighting device of claim 1, further comprising, a controller that controls the first power source and the second power source.

5. The lighting of claim 4, wherein the controller provides power to the OLEDs when the controller receives a dimming setting for the LEDs.

6. The lighting device of claim 1, wherein the plurality of LEDs has a shape and a size, and wherein the plurality of OLEDs has substantially the size.

7. The lighting device of claim 6, wherein the shape is a hexagon, wherein the plurality of OLEDs has the shape.

8. The lighting device of claim 7, wherein the plurality of OLEDs and the plurality of LEDs are arranged in a honeycomb pattern on the mounting surface.

9. The lighting device of claim 8, wherein each OLED is directly adjacent to only LEDs of the plurality of LEDs.

10. The lighting device of claim 1, wherein the first power source comprises a first controller for controlling the plurality of LEDs, and wherein the second power source comprises a second controller for controlling the plurality of OLEDs.

11. The lighting device of claim 1, wherein the first power source comprises an alternating current-to-direct current (AC/DC) converter, and wherein the second power source lacks an AC/DC converter.

12. The lighting device of claim 1, wherein the plurality of OLEDs are further illuminated when the first power source loses power.

13. A lighting fixture, comprising:
at least one organic light-emitting diode (OLED) disposed on a light source platform;
a housing mechanically coupled to the light source platform, wherein the housing lacks heat sink fins used for heat dissipation; and
a power source disposed within the housing and electrically coupled to the at least one OLED,
wherein the housing, the power source, and the at least one OLED are exposed to a high-temperature ambient environment.

14. The lighting fixture of claim 13, further comprising:
a lens mechanically coupled to the light source platform.

15. The lighting fixture of claim 13, wherein the high-temperature environment results in a maximum surface temperature of the housing at 185° F.

16. The lighting fixture of claim 13, wherein the housing is mounted on an electrical enclosure.

17. The lighting fixture of claim 16, wherein the electrical enclosure is located in a hazardous environment.

18. The lighting fixture of claim 17, wherein the electrical enclosure complies with applicable standards with the housing mounted thereon in the hazardous environment.

19. The lighting fixture of claim 18, wherein the electrical enclosure is an explosion-proof enclosure.

20. The lighting fixture of claim 13, wherein the housing is located in a hazardous environment, and wherein the at least one OLED reduces a probability of becoming a source of ignition in the hazardous environment.

* * * * *